INVENTORS
EMIL UMBRICHT
JOHN L. RUDLAFF
BY
Curtis, Morris and Safford
ATTORNEYS

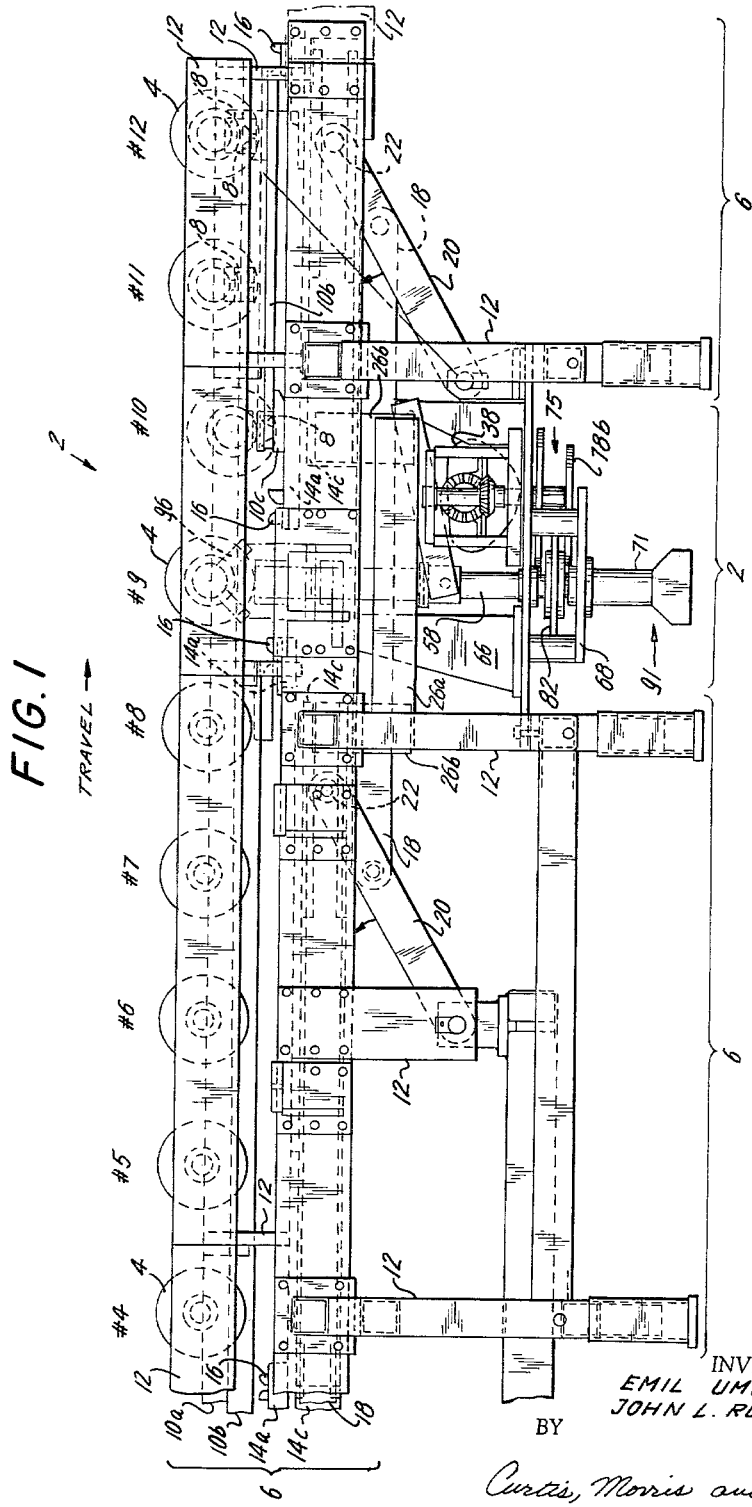

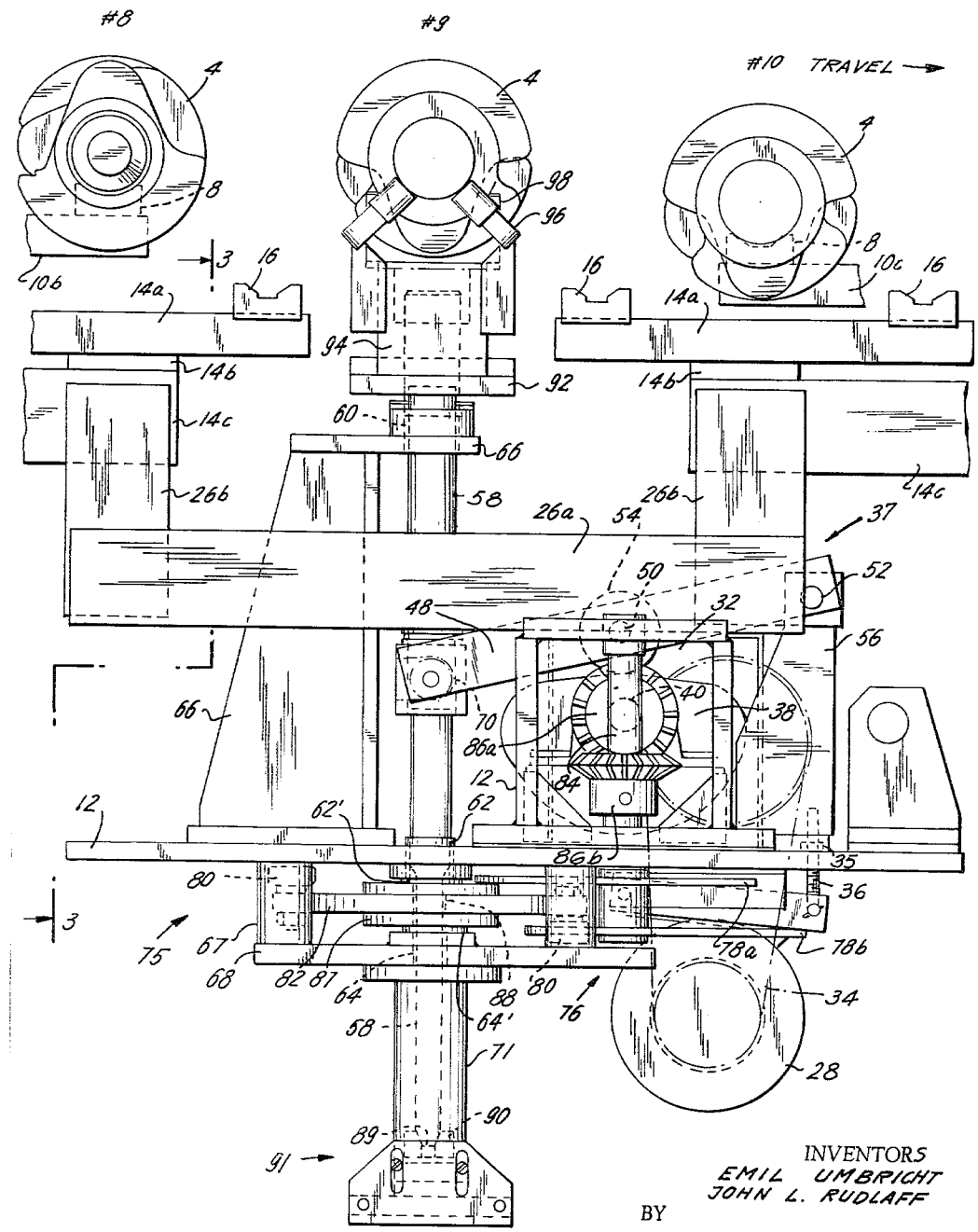

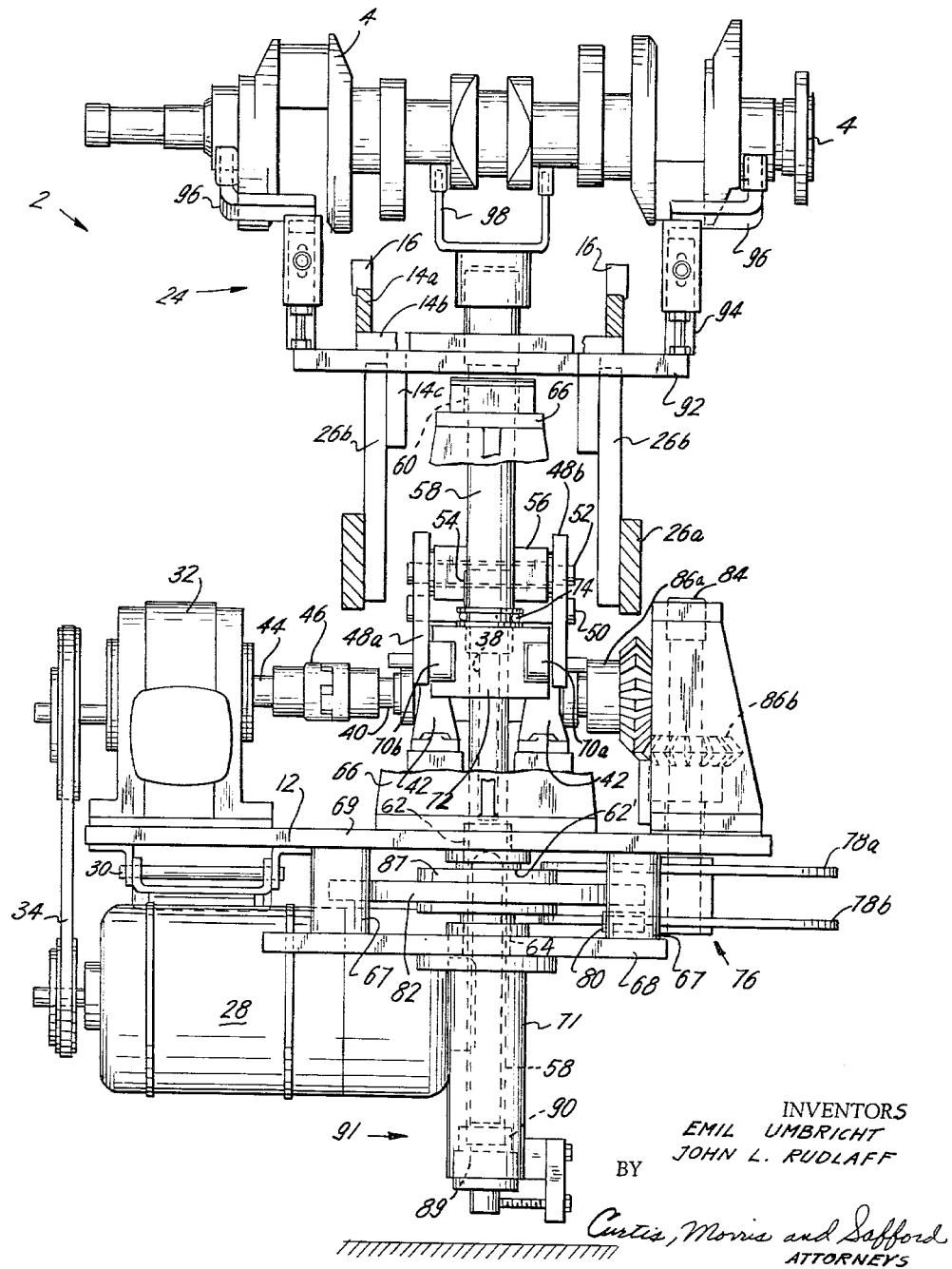

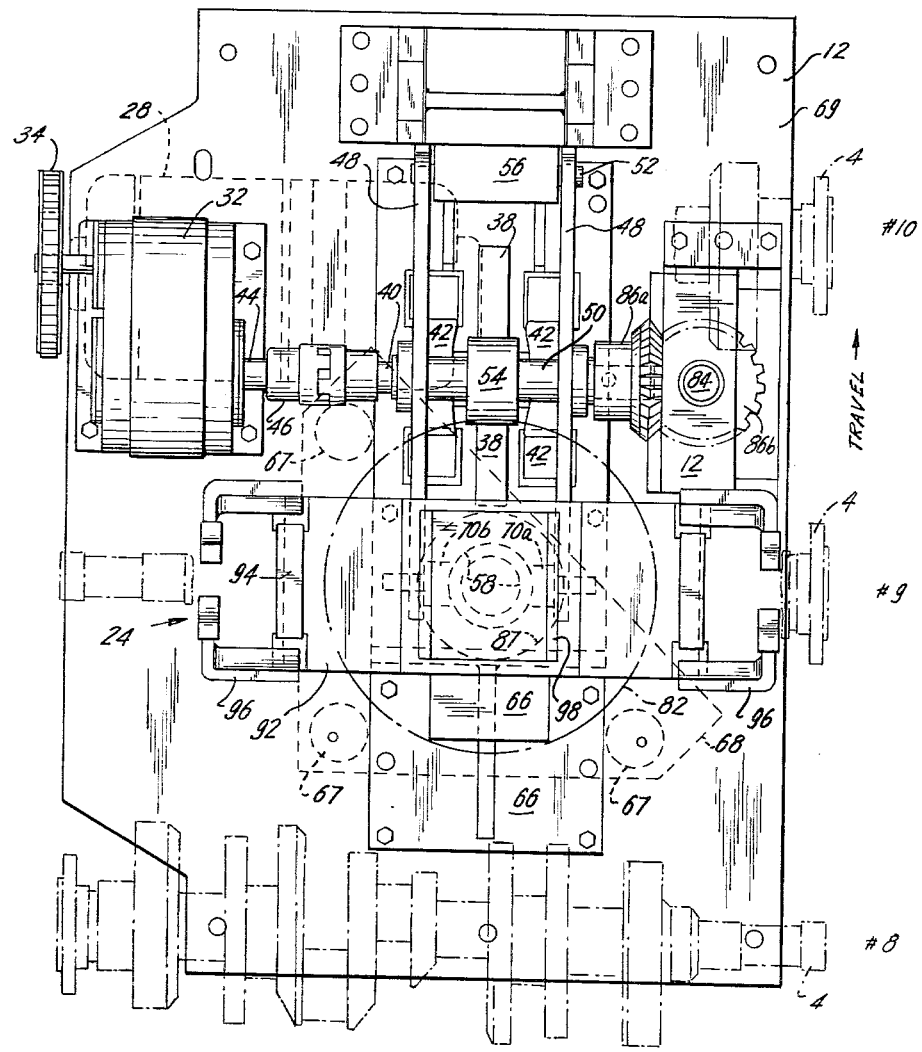

United States Patent Office 3,232,447
Patented Feb. 1, 1966

3,232,447
ARTICLE HANDLING DEVICE
Emil Umbricht, Northville, and John L. Rudlaff, Plymouth, Mich., assignors to Ajem Laboratories, Inc., Livonia, Mich.
Filed May 1, 1963, Ser. No. 277,272
3 Claims. (Cl. 214—1)

The present invention relates to an article handling device and more particularly to a device for rotatively reorienting at least one article at a time in a predetermined manner into one or more positions about and along a given axis of rotation.

Particularly in the automotive and related industries where large and heavy articles, such as engine blocks and crankshafts, must be delicately handled to protect and position their various surfaces which have been or are to be machined carefully to close tolerances, such article handling has been done in the past by hand or by complex and expensive machinery, often with separate mechanisms for separate components of motion required in a given article handling job.

It is an object of this invention to provide a simplified article handling mechanism for producing predetermined complex rotary and lift-and/or-lower motions.

It is also an advantage of this invention that only a single power source need be employed to produce these predetermined complex motions.

It is a further advantage of this invention that these complex motions are combined with precision in a predetermined manner and in addition, may be successfully adapted to function cooperatively with "walking beam" transfer devices.

In the preferred embodiment of this invention, a rotary indexing mechanism (of the type disclosed in FIGURE 14 of the copending application, Serial No. 268,870, filed March 29, 1963, and now Patent No. 3,170,333 by one of us, namely Emil Umbricht), for contributing the rotary component of motion is combined with a vertical lift cam-and-follower for contributing the generally vertical motion along the axis of rotation. This combination in this preferred embodiment is tied together by a one-to-one bevel gear to give a lift, 180° end-for-end turn, and a set-down motion driven by a single electric motor.

In this specification and the accompanying drawings we have shown and described a preferred embodiment of our invention and have suggested various alternatives and modifications thereof; but it is to be understood that these are not intended to be exhaustive and that many other changes and modifications can be made within the scope of the invention. These suggestions herein are selected and included for purposes of illustration in order that others skilled in the art will more fully understand the invention and the principles thereof and will thus be enabled to modify it and embody it in a variety of forms, each as may be best suited to the conditions of a particular use.

In the accompanying drawings:

FIGURE 1 is a schematic side elevation of the preferred embodiment of the present invention with only a portion of a "walking beam" transfer device shown for handling articles, schematically represented here as crankshafts, and with other parts omitted where necessary to avoid confusion. As shown, the present invention is incorporated at station #9 (a little to the right of center);

FIGURE 2 is a fragmentary side elevation of the same embodiment as in FIGURE 1 but showing a central portion on a larger scale and in greater detail, and with the articles (here illustrated as crankshafts) schematically outlined with the one at the upper center shown on the re-orienting device as it would appear after having been rotated end-for-end according to our present invention and awaiting transfer on;

FIGURE 3 is a view taken on line 3—3 of FIGURE 2, partially cut away at the center for clarity, and looking in the direction of travel of the transfer device, a portion of the latter being shown at the center;

FIGURE 4 is a plan view with three crankshafts partially outlined schematically at successive stations #8, #9 and #10, illustrating the relative positions of these crankshafts after the central one has been lifted and rotated end-for-end just prior to being transferred on;

The following description will be of the preferred embodiment of this invention, having a re-orienting device 2 for successively lifting individual articles 4, here crankshafts received from a transfer device 6, clear of obstruction, rotating them 180°, end-for-end, and lowering them back down into place ready to be transferred on. It should nevertheless be understood that this invention although especially adapted to this use is also generally applicable for producing complex predetermined motions having simultaneous and/or alternate rotary motion with linear motion along the axis of rotation, advantageously all with a single drive source.

Figure 2A:
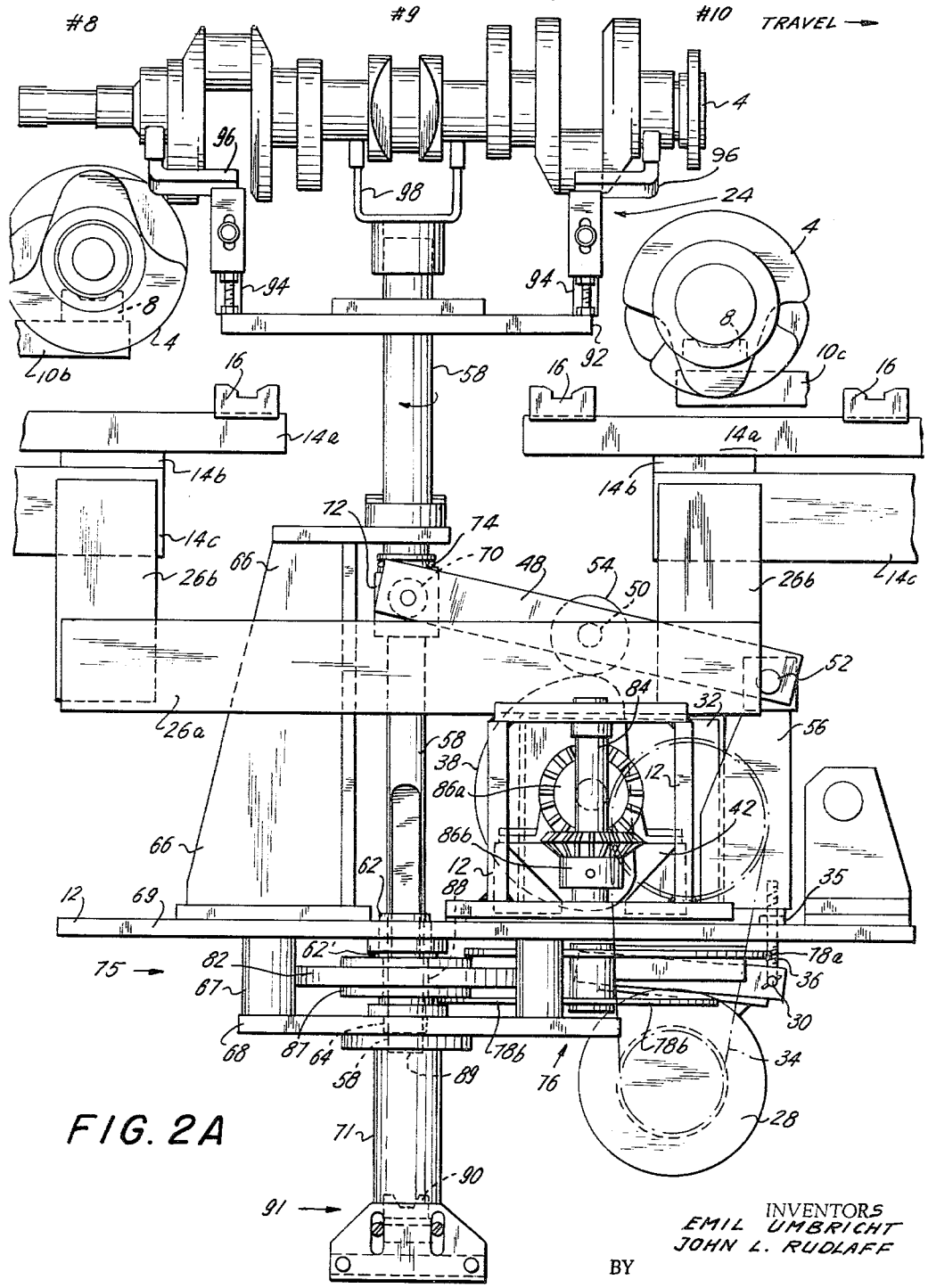
FIGURE 2a shows the same view as in FIGURE 2 except with the re-orienting device shown as it appears with the crankshaft in the raised position half-way through the 180° turn.

The "walking beam" article-transfer apparatus 6 partially shown in FIGURE 1 is disclosed and claimed in the copending application by one of us, namely Emil Umbricht, Serial No. 263,383, filed March 4, 1963. This apparatus 6 includes article holding stations, numbered #1, #2 . . . #12, each provided with article-positioning means 8 (in phantom outline only as stations #10, 11, and 12). These are mounted on support rails 10, which are anchored to the machine frame 12. A transfer frame 14 mounted to roll on support rollers 22 under the articles 4 to bring its article support pads 16 directly under the articles 4, ready to pick them up. Tie bars 18 (see FIGURE 1) connect the swinging lift arms 20 for parallel motion and so that one drive means can swing the arms simultaneously. When these arms swing upward and to the left, the support rollers 22 on their upper ends slidably support and lift the transfer frames 14. As the transfer frame 14 rises, its article support pads 16 engage the articles 4 and lift them out of the article holding pads 8, including the article holding cradle 24 FIGURE 2a of our re-orienting device 2 at station #9 (alternatively referred to as the "article holding means").

With the lift arms in their raised position, the transfer frame 14 is moved on rollers 22 longitudinally forward above the article holding station pads 8 carrying each article to the next succeeding station. When the articles 4 are positioned over the next succeeding stations, the lift arms 20 are pushed back to the right, lowering the transfer member 14, with the articles 4 thereon being set into the respective article holding pads 8. The transfer frame 14 is then shifted half-way back in anticipation of repeating the transfer cycle (see also the Umbricht copending article transfer application referred to above).

FIGURES 2 and 3 illustrate how the transfer frame 14 (here shown half-way through the return portion of the transfer cycle) is adapted to transfer articles 4 to and away from the article holding cradle 24 without obstructing our re-orienting device 2.

The transfer frame 14 is cut away at station #9, as shown in FIGURE 2, forming a gap permitting the article-holding cradle 24 to move vertically unencumbered by the transfer frame 14. Support fingers of rail 14a extend from either end of said gap and carry support pads 16 at their extremities for picking up or delivering an article to the re-orienting device at station #9, see FIGURE 2. The spaced ends of the longitudinal frame members 14c of the frame 14 are shown connected together by a bridge portion 26. This is illustrated as a depressed bridge 26, which is comprised of suspension members 26b secured to the end portions of the members 14c, and the bridging members 26a secured to lower parts of said suspension members so as to bridge the gap in the transfer frame members 14c, but only below the swinging portions of the re-orienting assembly 2. As there are support rails 14a and longitudinal members 14c at each side of the transfer frame, in the illustrated embodiment, there are shown bridges 26 at each side of the machine.

Cross-braces 14b (their mid-portions are broken away in FIGURE 3) hold the ends of the frame members in rectangular relation; and thus the support pads 16 on the rails 14a are kept in accurately predetermined relation to the rest of the frame 14.

When the transfer apparatus is operated, motion applied to either part of frame 14 is transmitted through the bridge 26 across the gap at 2 to correspondingly move the other part of frame 14 beyond the gap.

With this background we now turn to the structure and operation of our re-orienting device 6. An electric motor 28 (see FIGURES 2 and 3) is swingably mounted on the machine frame 12 by pivot 30 at one end of its base so that its weight tends to tighten its driving belt 34. This motor 28 drives a gear reducer 32 by the belt drive 34 (see FIGURE 3). A tension screw 36 (FIGURE 2a) adjusts by a nut 35 to add to the weight of the motor to maintain the proper belt pressure between the motor and the gear reducer.

The axial component of the motion of the re-orienting device, here vertical, is generated by an axial shift means, e.g. here, a cam and follower 37, see FIGURE 2. The lift cam 35 is fixed on axle 40, which is rotatably mounted on the machine frame 12 by bearings 42. The lift cam 38 is driven directly from the output shaft 44 of the gear reducer 32 through a drive coupling 46 (see FIGURE 3).

The cam follower includes a lift lever 48, formed of two parts 48a and 48b joined by the axle 50 of cam roller 54 and by the lever pivot 52. The cam roller 54 is positioned to ride on the peripherical surface of the lift cam 38 directly above the cam's axle 40. The outer ends of the lever arms 48 carry rollers 70, to be described below. Lever pivot 52 is advantageously fixed in a frame member 56 at a height such that the lift lever 48 is horizontal when half-way through the lifting motion. This arrangement reduces to a minimum the horizontal component of the cam roller's arc, thereby permitting the symmetrical cam 38 to impart a substantially symmetrical lift-and-lower motion.

The article holding cradle 24 is carried on the top of a support shaft 58. This shaft 58 is positioned vertically by slide-and-rotation bearings 60, 62, and 64. The upper slide bearing 60 is rigidly held by brace 66. The lower slide bearings 62 and 64 are respectively positioned in the machine frame 12 (see FIGURE 2) and in the support assembly comprising a plate 68 and spacer posts 67 by which it is secured to deck 69, a part of frame 12. The depending column 71 is secured to plate 68 by an upper flange as shown.

The support shaft 58 is axially positioned in these slide bearings and held at the operating height by lift lever 48, whose support rollers 70a and 70b, mounted inwardly at its free ends, slidably engage in the accommodation slots of lift block 72, which, in turn, is rotatively mounted on support shaft 58 by ball bearing 74 (whose inner race is mounted on the shaft 58 and whose outer race is mounted on the lift block 72). Thus when the lift cam 38 rotates to a position in which its maximum radius is vertical, the cam follower roller 54 swings up the lift lever 48, which raises the support shaft 58 by the lift block 72, thereby lifting the article 4 to its high position, shown in FIGURE 2a.

Figure 6:
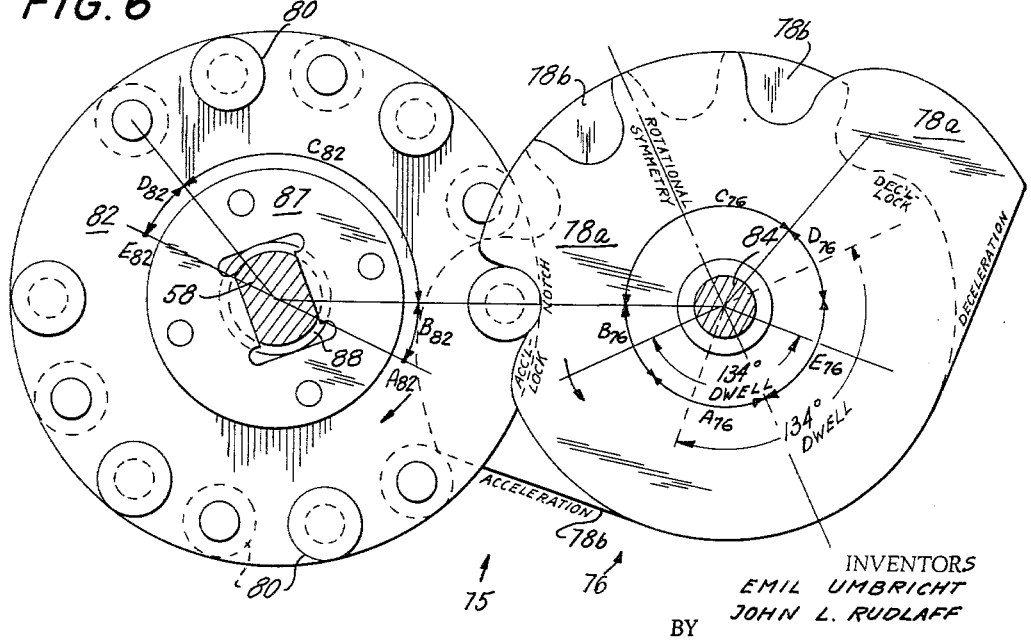
FIGURE 6 is a fragmentary view in horizontal section showing the rotary indexing mechanism with a 134° simultaneous dwell angle indicated for each cam plate of the mechanism. This mechanism is similar to the one illustrated in FIGURE 14 of the above-mentioned copending application and it here appears after rotationally accelerating the article through 25.7° from the dwell position.

The rotary indexing motion is generated by means 75, see FIGURE 6 and the description thereof, which includes a cam drive 76 whose two cam plates 78a and 78b respectively engage alternate cam rollers, e.g. 80 (only two such rollers being illustrated on FIGURE 2 and only one on FIGURE 3 and omitted on the remaining figures for the sake of simplicity). The stub axle 84 of cam drive 76 is driven (from the same motor 28 as is the lift cam 38) through bevel gears 86a and 86b, which engage each other at right angles, being respectively fixed to the lift cam axle 40 and to the drive cam stub axle 84. Thus the cam drive 76 receives the rotary motion of the electric motor 28 and modifies it to transmit a smooth intermittent rotary component of motion to the support shaft 58 through the indexing wheel 82.

A portion of the lower part of support shaft 58 is partially flattened (see FIGURE 6) to fit slidably into the slotted hubs 87 of the indexing wheel 82, in order to key the shaft 58 with the rotary indexing wheel 82 so the rotary motion of the latter is transmitted to the former. Thus this indexing wheel 82 uses this shaft 58 as a slidable axle, and is located on this shaft 58 by bushing 88 and is kept horizontal by the flanges 62' and 64' of bearings 62 and 64 (see FIGURE 2).

The bottom end 89 of support shaft 58 is cut to a blunt taper, or V-shape, to enable it to rest in a complementarily shaped female block 90, which is part of an adjustable rest-position-precision-locator 91.

The article holding cradle 24 in this embodiment includes a cross plate 92 (see FIGURES 2a and 3) with end plates 94 having angled-support fingers 96 adjustably mounted thereon and includes central-support fingers 98, all of which fingers supportably bear up on several of the crankshaft's bearing surfaces, and therefore are preferably protectively coated, such as with a neoprene rubber as are the article holding pads 8 and support pads 16, preferably).

Figure 5:
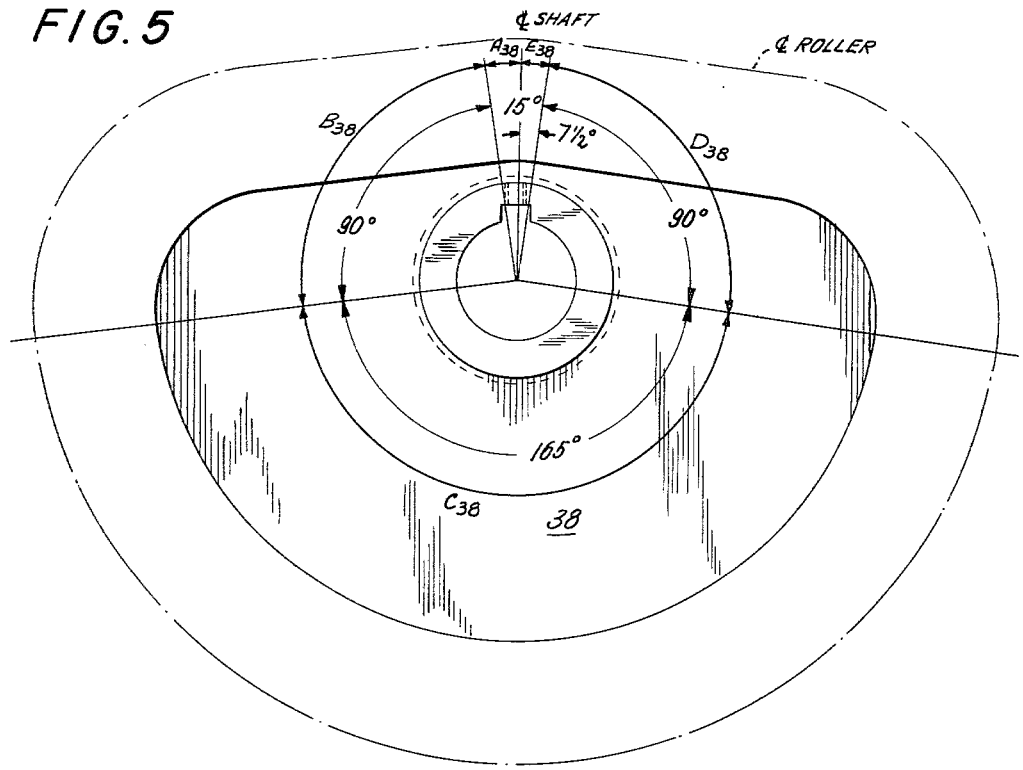
FIGURE 5 is a side elevation of the lift cam wheel with the upper and lower dwell angles indicated thereon.

By way of example, one sequence of operation of this illustrated example gives 180°, end-for-end repositioning, with a lift cam 38 (as illustrated in FIGURE 5) and with a rotary indexing device (as illustrated in FIGURE 6), substantially as indicated in the following table, starting from rest at mid-positions in the dwells and identifying the position by the line through the centers of cam 38 and follower roller 54, in the first case, and of the cams 78a and 78b and the indexing wheel 82 in the other cases: therein, cam and follower means for supporting said support shaft in said shaft bearing means and for imparting

| | Lift cam 38 | | | Cam drive 76 | | | Indexing wheel 82 |
|---|---|---|---|---|---|---|---|
| | Angular location, deg. | Event | Duration, deg. | Angular location, deg. | Event | Duration, deg. | Corresponding rotation as received from cam drive, deg. |
| A | 7½ | ½ lower dwell | 7½ | 67 | ½ dwell | 67 | 0 |
| B | 97½ | Rising | 90 | 115.7 | Acceleration | 48.7 | 25.7 |
| C | 262½ | Upper dwell | 165 | 244.3 | Constant rotation | 128.6 | 128.6 |
| D | 352½ | Lowering | 90 | 293 | Deceleration | 48.7 | 25.7 |
| E | 360 | ½ lower dwell | 7½ | 360 | ½ dwell | 67 | 0 |
| Total | | | | | | | 180 |

The lift cam 38 has a 15° dwell period in the lower (rest) position. This presumably allows 7½° in which the electric motor 28 can be shut off or its drive otherwise disconnected (to permit the article to be transferred on) and 7½° in which the drive may again be initiated. This permits the electric motor to attain operational speed before assuming the work-load. Then for 90° (a total of 97½°) the lift cam 38 raises the crankshaft 4 with smooth acceleration and deceleration. The indexing device 75, rather than waiting 97½° until the lifting is complete, instead starts rotating after only 67° (i.e. when obstructions on the "walking beam" 6 are sufficiently cleared to permit initiation of the rotating), so that accelerating rotation and decelerating lifting are occurring simultaneously for about 30° (resulting is an estimated rotation of the article of about 20°). This has two advantages, it permits rotation to occur over a greater portion of the 360° reorienting cycle, thereby, first, extending the rotary acceleration periods to allow slower and therefore less jerky operation, and/or, second, extending the constant angular velocity periods, thus permitting the articles to be handled both more smoothly and/or more quickly. Rotation then continues alone for 165° while the lift arm 38 dwells in the upper position, during which the acceleration is completed (see FIGURE 6, a constant angular velocity is achieved for 128.6°, and deceleration is started. Then rotary deceleration and lowering occur as the symmetrical opposite of the rotary acceleration and lifting described above.

We claim:
1. In a walking-beam type transfer apparatus having a transfer member and a series of article holding stations through which articles, such as heavy castings and the like, are successively advanced, a reorienting device positioned at one of said stations to receive successively said articles, lower or lift clear, rotate, and return them into a new orientation for transfer on to the succeeding stations, comprising a support shaft, a machine frame, shaft bearing means mounted on said machine frame along which said support shaft can slide and in which it can rotate, said transfer member having a bridge portion around a gap maintained in said transfer member for the reorienting station, said transfer member further having support fingers extending toward said reorienting station at either end of the gap, article holding means mounted on said support shaft having clearance permitting the support fingers of said transfer member to pass under an article held in said article holding means whereby said transfer member can pick up and set down articles therein, cam and follower means for supporting said support shaft in said shaft bearing means and for imparting the axial component of the shaft's motion, rotary indexing means slidably keyed to said shaft for imparting the rotary component of the shaft's motion, a single drive means for rotating said cam means and said indexing means said cam means and said rotary indexing means each having at least one dwell angle which overlap each other with the article holding means in position for article transfer, and timing means for effecting the transfer while said article holding means is held stationary.

2. A device as described in claim 1 further comprising a precision locator rest support means for gravity camming said article holding means into a predetermined rest position during article transfer.

3. A smooth, precise, fast acting, reorienting device for rotating and moving along the axis of rotation an article, such as heavy castings and the like, in a predetermined manner comprising a support shaft, article holding means mounted on said support shaft, shaft bearing means along which said support shaft can slide and in which it can rotate, cam and positive-engaging follower means for supporting said support shaft in said shaft bearing means during the reorientation and for smoothly imparting the axial component of the shaft's motion with smooth acceleration and deceleration, positive-engaging rotary indexing means slidably coupled to said shaft for imparting the rotary component of the shaft's motion with smooth acceleration and deceleration, said rotary indexing means being shaped to impart overlapping rotary motion to said support shaft while said cam means imparts at least a portion of the elevated deceleration and acceleration to said shaft whereby the reorientation of the article is effected more swiftly without awaiting completion of the necessary, yet time consuming, elevated acceleration and deceleration, and a single drive means for rotating said cam means and said indexing means.

References Cited by the Examiner

UNITED STATES PATENTS

| | | |
|---|---|---|
| 2,639,822 | 5/1953 | Sax. |
| 2,780,340 | 2/1957 | Hynson. |
| 2,813,638 | 11/1957 | Miller. |
| 2,897,948 | 8/1959 | Cranston _____ 198—33.2 |
| 2,937,553 | 5/1960 | Sherman. |
| 2,986,949 | 6/1961 | Lancaster _____ 74—820 X |
| 3,045,802 | 7/1962 | Miller _____ 198—33.2 |

GERALD M. FORLENZA, *Primary Examiner.*

HUGO O. SCHULZ, *Examiner.*